United States Patent
Gouhara

(10) Patent No.: US 8,004,618 B2
(45) Date of Patent: Aug. 23, 2011

(54) DIGITAL BROADCAST RECEIVER

(75) Inventor: Hidenori Gouhara, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 1321 days.

(21) Appl. No.: 11/596,110

(22) PCT Filed: Apr. 26, 2005

(86) PCT No.: PCT/JP2005/008381
§ 371 (c)(1),
(2), (4) Date: Nov. 10, 2006

(87) PCT Pub. No.: WO2005/109654
PCT Pub. Date: Nov. 17, 2005

(65) Prior Publication Data
US 2007/0174891 A1    Jul. 26, 2007

(30) Foreign Application Priority Data
May 12, 2004    (JP) .................................. 2004-142153

(51) Int. Cl.
*H04N 5/50* (2006.01)
*H04N 5/455* (2006.01)

(52) U.S. Cl. ......................... 348/731; 348/725; 348/726

(58) Field of Classification Search .......... 348/731–733, 348/725, 726, 563–569, 553–554, 570; 725/49, 725/56, 59, 131, 100, 38–39; 455/45, 161.3, 455/226.1, 132; H04N 5/50, 5/455
See application file for complete search history.

(56) References Cited

U.S. PATENT DOCUMENTS

| 5,598,429 | A | 1/1997 | Marshall |
| 5,877,822 | A | 3/1999 | Tazine et al. |
| 7,260,824 | B2 * | 8/2007 | Du et al. .......................... 725/59 |
| 7,468,762 | B2 * | 12/2008 | Ishihara et al. ................ 348/732 |
| 2006/0038926 | A1 * | 2/2006 | Mayer et al. ................... 348/731 |

FOREIGN PATENT DOCUMENTS

| CN | 1142158 A | 2/1997 |
| CN | 1419372 A | 5/2003 |
| JP | 5-218811 | 8/1993 |
| JP | 7-212800 | 8/1995 |
| JP | 7-231245 | 8/1995 |
| JP | 10-150346 | 6/1998 |

(Continued)

OTHER PUBLICATIONS

Office action dated Feb. 16, 2010, corresponding Japanese Patent Application No. 2004-142153; including English Translation; 6pp.

(Continued)

*Primary Examiner* — Trang U Tran
(74) *Attorney, Agent, or Firm* — Christie, Parker & Hale, LLP

(57) ABSTRACT

A broadcast channel detection system enabling search of channels providing a digital television broadcast from among a large number of channels at a high speed.
This is configured by a periodic signal detecting function unit 21 receiving as input a selected received signal when a channel selecting function unit 12 selects a desired channel and detecting periodic signals (P) appearing at substantially constant timings, a periodicity distribution finding function unit 22 for finding a state of distribution of the cluster of periodic signals (P) detected a plurality of times, and a decision function unit 23 deciding the presence of a digital broadcast according to whether a width of the distribution of the cluster detected fits in a predetermined width.

16 Claims, 6 Drawing Sheets

FOREIGN PATENT DOCUMENTS

| | | |
|---|---|---|
| JP | 2001-230689 | 8/2001 |
| JP | 2001-313622 * | 11/2001 |
| JP | 2001-320290 | 11/2001 |
| JP | 2002-320165 | 10/2002 |
| JP | 2003-339061 | 11/2003 |
| JP | 2004-15315 | 1/2004 |
| JP | 2004-64304 | 2/2004 |
| WO | WO 03/043210 A1 | 5/2003 |

OTHER PUBLICATIONS

International Search Report, dated Aug. 30, 2005, corresponding to PCT/JP2005/008381.

Patent Abstracts of Japan, Publication No. 05218811 A, Published on Aug. 27, 1993, in the name of Hirata, et al.

Patent Abstracts of Japan, Publication No. 07212800 A, Published on Aug. 11, 1995, in the name of Miyahara.

Patent Abstracts of Japan, Publication No. 07231245 A, Published on Aug. 29, 1995, in the name of Takagi.

Patent Abstracts of Japan, Publication No. 10150346 A, Published on Jun. 2, 1998, in the name of Hamasuna.

Patent Abstracts of Japan, Publication No. 2001230689 A, Published on Aug. 24, 2001, in the name of Sato, et al.

Patent Abstracts of Japan, Publication No. 2001320290 A, Published on Nov. 16, 2001, in the name of Sawano.

Patent Abstracts of Japan, Publication No. 2002320165 A, Published on Oct. 31, 2002, in the name of Fujimoto.

Patent Abstracts of Japan, Publication No. 2003339061 A, Published on Nov. 28, 2003, in the name of Kondo.

Patent Abstracts of Japan, Publication No. 2004015315 A, Published on Jan. 15, 2004, in the name of Kondo.

Patent Abstracts of Japan, Publication No. 2004064304 A, Published on Feb. 26, 2004, in the name of Takahashi, et al.

Supplemental European Search Report for corresponding European patent application No. 05736809.4, dated Aug. 27, 2010, 3pp.

* cited by examiner

DIGITAL BROADCAST RECEIVER

CROSS-REFERENCE TO RELATED APPLICATION

This application is a National Phase Patent Application of International Application Number PCT/JP2005/008381, filed on Apr. 26, 2005, which claims priority of Japanese Patent Application Number 2004-142153, filed on May 12, 2004.

TECHNICAL FIELD

The present invention relates to a broadcast receiver for example, a digital broadcast receiver, more particularly relates to a digital broadcast receiver having a broadcast channel detection system for searching for and detecting a channel actually providing a broadcast among a predetermined plurality of channels, that is, a broadcast channel.

BACKGROUND ART

A broadcast channel detection system is a system essential for successively searching through a large number of channels and detecting a broadcast channel among them, that is, a so-called "channel search", or for storing in advance a receivable plurality of channels of broadcast stations for each area and enabling a desired broadcast station to be received later by a simple selection operation, that is, "auto preset". In particular, for example, in a digital broadcast receiver such as a ground digital broadcast receiver or satellite digital broadcast receiver required to quickly capture only broadcast channels among an extremely large number of predetermined channels such as for example 50 channels, the broadcast channel detection system plays an important role.

As the conventional basic elements making up this broadcast channel detection system, there are
  a) a station selecting tuner,
  b) a mode/guard search unit, and
  c) an OFDM frame synchronization unit.

The a) station selecting tuner is a circuit component for individually receiving the predetermined plurality of channels one by one and is a front end component comprised of a so-called high frequency amplification unit, frequency conversion unit, filter, etc.

The b) mode/guard search unit is a circuit component receiving as input a frame signal received by an OFDM (Orthogonal Frequency Division Multiplexing) receiving system suitable for forming a digital broadcast receiver and (i) searching for the "mode", that is, whether the frame signal has been received under one of the various types of transmission modes of the mode 1, mode 2, and mode 3, and further (ii) searching for the "guard", that is, the phase of appearance of a so-called guard interval for preventing interference between a so-called effective symbol and the adjoining effective symbols.

The c) OFDM frame synchronization unit is one of the important circuit components forming the OFDM demodulation unit in the OFDM receiver. If frame synchronization is established for the received signal of a selected channel, it is confirmed that this received signal is a received signal of one of the broadcast waves. After this confirmation, the received signal is converted from a signal in the time domain to a signal in the frequency domain, then is demodulated by OFDM by an OFDM demodulation circuit after FFT (Fast Fourier Transformer). Further, it is decoded by an MPEG (Moving Picture Experts Group) decoder and used to reproduce video/audio information to provide video (TV) information and audio information to the user.

The broadcast channel detection system of the digital broadcast receiver covered by the present invention is utilized for example for the "channel search" etc., so it is crucial that the broadcast channels be found at a high speed. Unless this search can be performed at a high speed, the user will end up feeling dissatisfied.

Note that as known publications related to the present invention, there are for example the following [Patent Document 1] to [Patent Document 4].

[Patent Document 1] uses one tuner to receive one station and simultaneously searches for other stations by another tuner, [Patent Document 2] divides a scanning band into two and uses two tuners for separate auto presetting, [Patent Document 3] compares the audio output of two tuners and prevents doubly automatically storing programs of the same content, and [Patent Document 4] uses two tuners alternately for searching and auto preset.

[Patent Document 1] Japanese Patent Publication (A) No. 2002-320165
[Patent Document 2] Japanese Patent Publication (A) No. 5-218811
[Patent Document 3] Japanese Patent Publication (A) No. 7-231245
[Patent Document 4] Japanese Patent Publication (A) No. 10-150346

DISCLOSURE OF THE INVENTION

Problem to be Solved by the Invention

As explained above, a broadcast channel detection system of a digital broadcast receiver has to capture broadcast channels at a high speed from among a large number of channels. Investigating the "channel search time" required at each of the above components a), b), and c), the results become as follows. However, these are shown by estimated time.

a) The tuner selection time is "50 ms". However, this is at the time of PLL synchronization of the tuner.

b) The mode/guard search time is "100 ms".
However, this is the entire mode/guard search time at the predetermined 12 modes. Note that ¼ of the frame signal length in the OFDM system becomes the guard interval. Further, the frame signal length under the mode 3 is the longest. The length is ½ of that under the mode 2. The length under the mode 1 is ¼ of that of the mode 3.

c) The OFDM frame synchronization establishment time is "205 to 411 ms". This is a period of one frame to two frames. Two frames, that is, detection of frame synchronization twice, is due to the following reason.

First, one frame is enough when the head of a frame arrives exactly after the start of input of the received signal. However, when the head of a frame ends up already being passed immediately before the start of input of the received signal, it is necessary to wait for the arrival of the head of the next frame until starting the frame synchronization detection operation. The above two frames are required in this case.

The "205 to 411 ms" of c) is a numerical value obtained at the time of the longest frame having the ¼ length guard interval in the case of the above "mode 3". That is, the 205 ms is the numerical value obtained as 204 symbols×1.25 ms=205 ms.

In the end, the total search time of a broadcast channel comprised of the total of the tuner selection time (=50 ms), the mode/guard search time (=100 ms), and the OFDM frame synchronization establishment time (=205 to 411 ms) becomes "355 to 561 ms". Therefore, the average time is "458 ms". This is about 0.5 second. For example, assuming there are 50 channels, the time required for the completion of the search for all channels ends up becoming an extremely long 25 seconds even at the minimum.

Therefore, an object of the present invention, in view of this problem, is to provide a digital broadcast receiver having a broadcast channel detection system enabling a much faster channel search.

Means for Solving the Problems

FIG. 1 is a view of the basic configuration of the broadcast channel detection system provided with a digital broadcast receiver according to the present invention.

In the figure, the left end reference numeral 10 indicates a general digital broadcast receiver which is generally configured by an antenna 11 for receiving a wireless channel, a channel selecting function unit 12 for selecting a desired signal channel (broadcast) from among a received large number of channels, an OFDM demodulation unit 13 for demodulating by OFDM the received signal of the selected channel, a video/audio reproduction processor 14 for reproducing broadcast content by the demodulated received signal, and a display DISP and speaker SP for enabling the reproduced video information and audio information to be enjoyed by the user.

The present invention relates to such a digital broadcast receiver 10, in particular a broadcast channel detection system 20 provided there. This broadcast channel detection system 20, as illustrated, basically is comprised of a periodic signal detecting function unit 21, a periodicity distribution finding function unit 22, and decision function unit 23. The results of decision by this decision function unit 23 are stored in a memory 24 or are fed back to the channel selecting function unit 12 for the next selection. The functions of these three function units 21, 22, and 23 are as follows:

When the channel selecting function unit 12 forming part of the digital broadcast receiver 10 selects a desired channel from the received plurality of channels, the periodic signal detecting function unit 21 receives as input the selected received signal and detects any periodic signals appearing at a substantially constant timing.

The next periodicity distribution finding function unit 22 finds the state of distribution of the cluster of the periodic signals detected by the periodic signal detecting function unit 21 a plurality of times.

When the width of the distribution of the cluster found by the periodicity distribution finding function unit 22 fits in a predetermined width, the decision function unit 23 decides that "there is a digital broadcast", while when it will not fit in this predetermined width, it decides "there is no digital broadcast".

As stated in the above [PROBLEM TO BE SOLVED BY THE INVENTION], the majority of the average time (=458 ms) required for the channel search is taken up by the OFDM frame synchronization establishment time. The present invention takes note of this point and attempts to equivalently deduce the presence of a broadcast channel at a high precision without "frame synchronization". Specifically, it takes note of the distribution of the above cluster of periodic signals (explained later) and attempts to deduce this from this distribution.

Effects of the Invention

Therefore, the present invention eliminates the most time consuming conventional step of "confirmation of completion of frame synchronization", so a much higher speed broadcast channel search than the past is realized.

For example, in the case of ground digital television broadcasts, there are the 50 channels worth of bandwidth of the UHF 13 channel (ch) to 62 ch. Whether or not these channels (ch) are used for broadcasts, whether or not the channels are used for analog television broadcasts, and whether or not the channels are just noise, that is, regardless of the number of actual channels in use, a one-branch configuration digital broadcast receiver can complete the search for all channels (50 ch) in 10 odd seconds, while a carrier diversity configuration digital broadcast receiver having two branches can complete the search within 10 seconds.

BEST MODE FOR WORKING THE INVENTION

Figure 1:
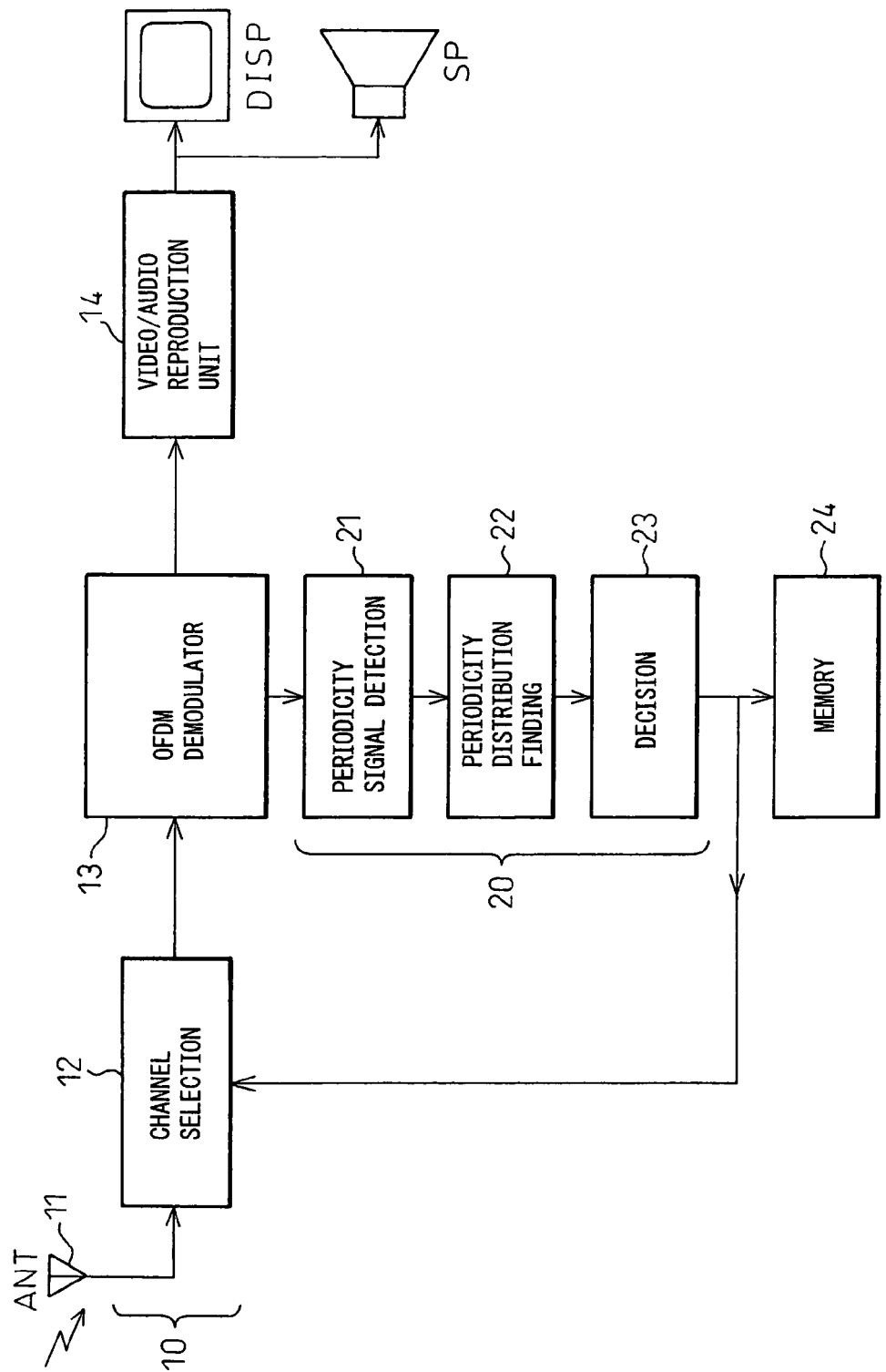
FIG. 1 is a view of the basic configuration of a broadcast channel detection system provided with a digital broadcast receiver according to the present invention.
Figure 2:
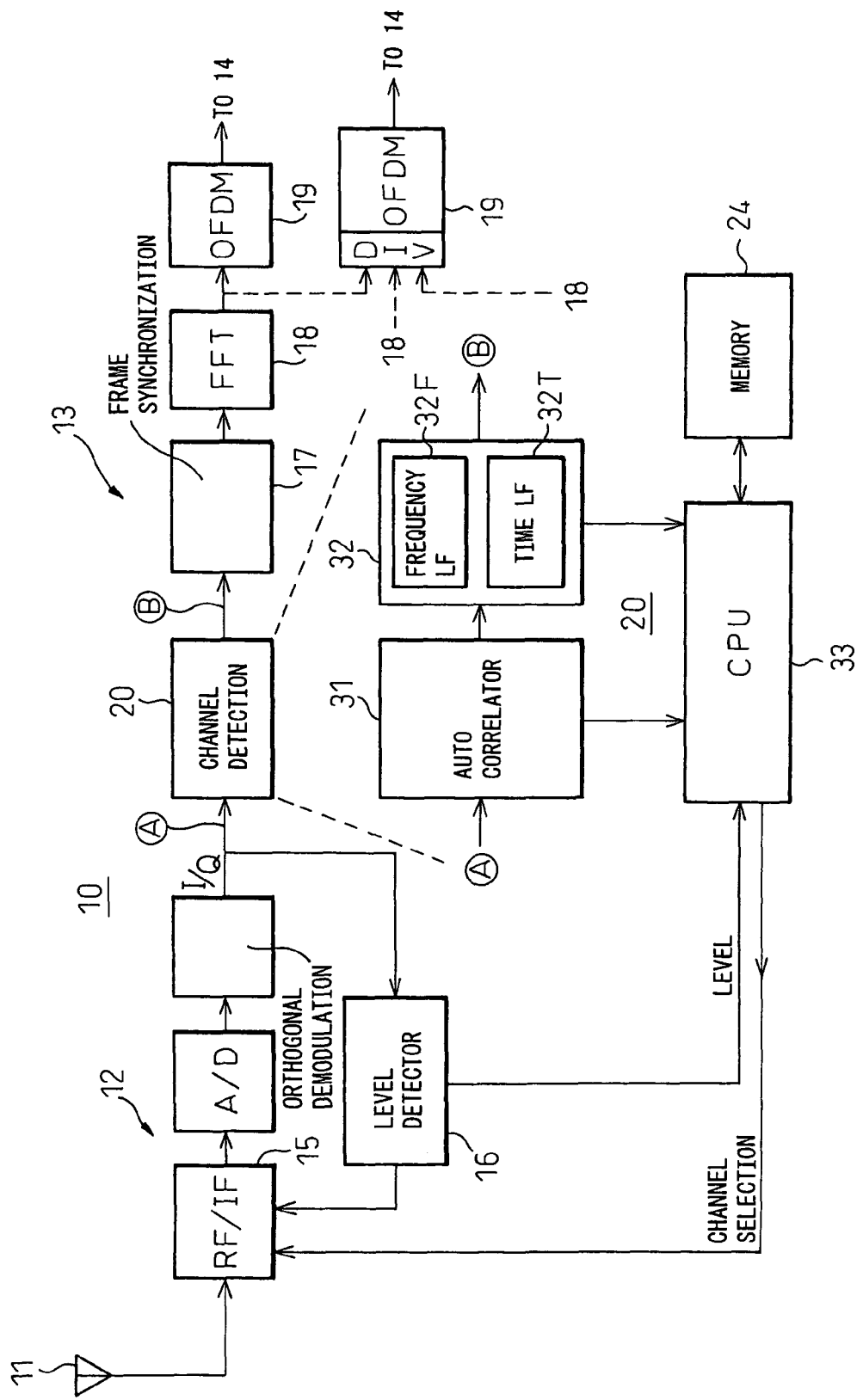
FIG. 2 is a block diagram showing the basic configuration of FIG. 1 a bit more specifically.

FIG. 2 is a block diagram showing the basic configuration of FIG. 1 in somewhat more detail and shows a broadcast channel detection system 20 provided at a digital broadcast receiver 10.

In the figure, the points shown in more detail compared with FIG. 1 are as follows:

The channel selecting function unit 12 of FIG. 1 is shown in FIG. 2 as an RF/IF unit 15, that is, a frequency conversion unit. Further, a level detector 16 for so-called AGC control is also shown. Further, the most basic components in a digital broadcast receiver, that is, an A/D converter (A/D) and quadrature demodulator are also shown. The output from this quadrature demodulator is a so-called I/Q signal.

Further, skipping over the intermediate broadcast channel detection system 20, the above-mentioned frame synchronization unit 17 and the above-mentioned FFT 18 forming parts of the OFDM demodulation unit 13 of FIG. 1 are shown. Further, the OFDM demodulator (OFDM) 19 forming the heart of the OFDM demodulation unit 13 is also shown. The output from this demodulator 19 is supplied to the video/audio reproduction processor 14 of FIG. 1. Note that FIG. 2 shows a one-branch configuration digital broadcast receiver, but for example if using a carrier diversity configuration having three branches, the diversity circuit DIV shown at the right side of FIG. 2 is used to supply the OFDM demodulator 19 with the signals received from the FFTs 18 of the three branches. When the digital broadcast receiver 10 has a carrier diversity configuration having a plurality of branches in this way, each branch is provided with the above-mentioned periodic signal detecting function unit 21, periodicity distribution finding function unit 22, and decision function unit 23. If there are N branches, the channel search ends in 1/N the time.

Now, taking note here of the broadcast channel detection system 20 at the center of FIG. 2, as shown enlarged in detail at the bottom, this system 20 can be configured by either of the auto correlator 31 and synchronization loop filter 32 originally components of the digital broadcast receiver 10, a CPU 33, and a memory 24.

Here, looking at the periodic signal detecting function unit 21 of FIG. 1, this is configured from either of the auto correlator 31 and synchronization loop filter 32. Note that this synchronization loop filter 32 is usually provided with both a frequency synchronization loop filter (LF) 32F and a time synchronization loop filter (LF) 32T, but either of these two loop filters (32F, 32T) alone is sufficient for achieving the object of detection.

In this way, the periodic signal detecting function unit 21 includes the auto correlator 31 configuring the digital broadcast receiver 10 and detects auto correlation peaks (later explained P) output from this auto correlator 31 and exceeding a predetermined threshold value as periodic signals.

Further, when the digital broadcast receiver 10 is provided with a frequency synchronization loop filter 32F and time synchronization loop filter 32T provided after the auto correlator 31, the periodic signal detecting function unit 21 can detect as the periodic signals the filter output which is output from either of the frequency synchronization loop filter 32F and time synchronization loop filter 32T linked with the auto correlation peaks (later explained P) and exceeding a predetermined threshold value.

On the other hand, the periodicity distribution finding function unit 22 and decision function unit 23 of FIG. 1 are, in the case of FIG. 2, configured by software using the CPU 33. Of course, these function units 22 and 23 may also be configured by hardware. This would lighten the load of the CPU 34.

Explaining the operating principle of the broadcast channel detection system 20 according to the present embodiment here, the point lies in the above-mentioned "auto correlation peaks". The auto correlation peaks are obtained by the auto correlator 31. Usually, this performs the function of the "mode/guard search unit".

Figure 3:
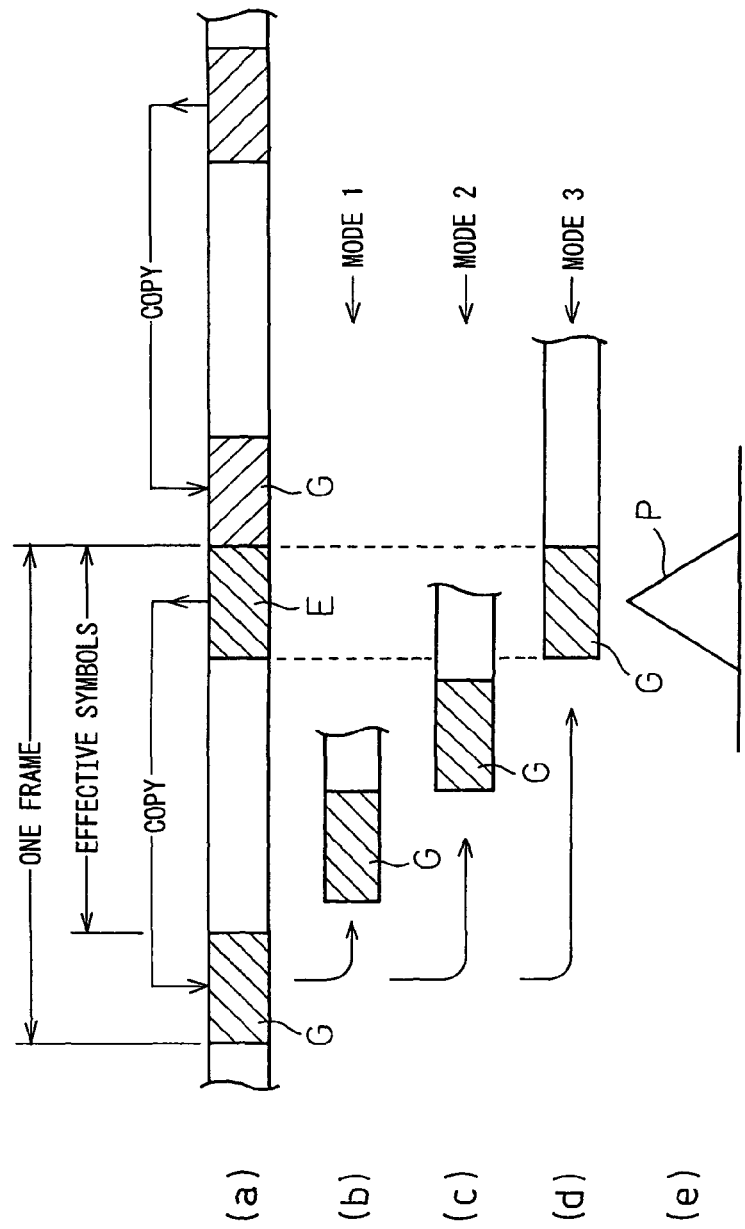
FIG. 3 is a timing chart for explaining auto correlation peaks.

FIG. 3 is a timing chart for explaining auto correlation peaks.

Assume here that an OFDM frame signal is received by the transmission mode of the "mode 3" shown in (a) of the figure. However, it is not known by what transmission mode the digital broadcast receiver 10 itself is receiving the frame signal. That is, it is not known if it is receiving the signal by the "mode 1", the "mode 2", or the "mode 3", so the mode/guard search unit investigates the presence of the auto correlation peaks in order for each mode.

An OFDM frame signal, as is well known, is comprised of frames each comprised of "effective symbols" and a "guard interval" G. Further, this guard interval G is a copy of the tail end E of the effective symbol portion. The mode/guard search unit assumes that the frame signal has been received in the mode 1 (see (b) of FIG. 3) and obtains the auto correlation by a signal delayed by exactly the frame length of the mode 1. However, in this case, no auto correlation peaks are obtained. Therefore, next, it assumes that the frame signal has been received in the mode 2 and again obtains the auto correlation by a signal delayed by exactly the frame length of the mode 2 (see (c) of FIG. 3). However, in this case as well, no auto correlation peaks are obtained. Finally, it assumes that the frame signal has been received in the mode 3 and obtains the auto correlation by a signal delayed by exactly the frame length of the mode 3 (see (d) of FIG. 3). This being so, here, the guard interval G and the tail end E of that frame signal match in bit patterns, and a sharp auto correlation peak is obtained. This is shown schematically by the auto correlation peak P shown at (e) of FIG. 3.

Figure 4:
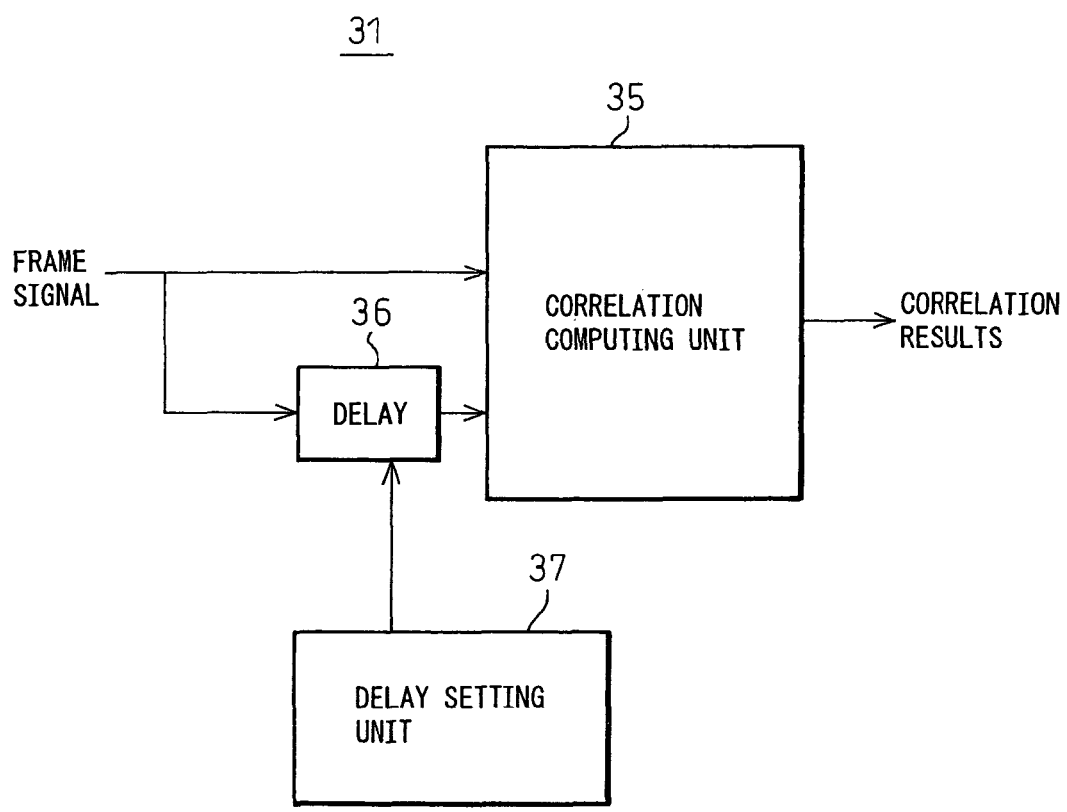
FIG. 4 is a view of an example of the configuration of an auto correlator.

FIG. 4 is a view of an example of the configuration of an auto correlator. This auto correlator 31 is mainly comprised of a correlation computing unit 35 and a delay unit 36. The frame signal directly input to this correlation computing unit 35 corresponds to (a) of FIG. 3, while the signals input through the delay unit 36 correspond to (b), (c), and (d) of FIG. 3. That is, the delay unit 36 successively gives the frame signal three delay times corresponding to the mode 1, mode 2, and mode 3 and inputs the results to the correlation computing unit 35 under the control of the delay amount setting unit 37. Due to this, finally auto correlation peaks P can be obtained.

The inventors examined the behavior of auto correlation peaks P and discovered a certain fact. This fact is that when observing the auto correlation peaks P, in particular the auto correlation peaks P exceeding a certain predetermined threshold value, over time and further statistically analyzing them, the distribution of that cluster of auto correlation peaks P (the above-mentioned cluster of periodic signals) exhibits a certain characteristic feature. This characteristic feature is that when successively selecting channels, in particular, when selecting channels providing digital television broadcasts, the width of the distribution of the cluster fits in a predetermined width. This will be explained by a drawing.

Figure 5:
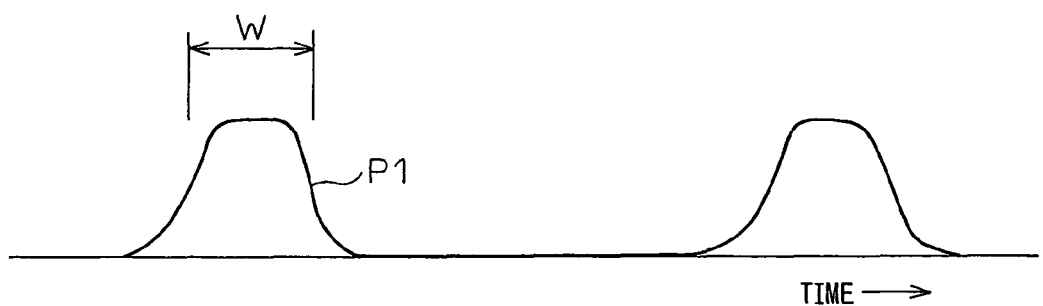
FIG. 5 is a view showing the distribution of auto correlation peaks in the case where there is a digital television broadcast.
Figure 6:
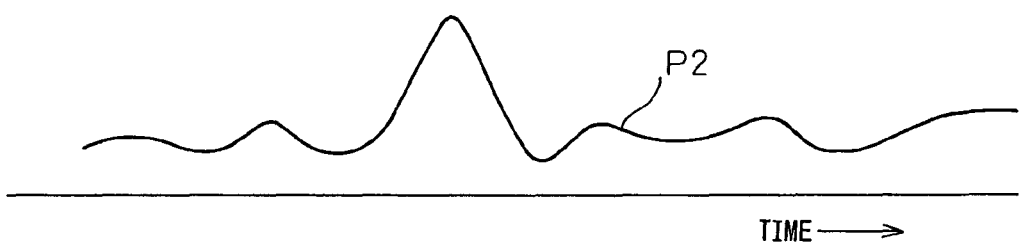
FIG. 6 is a view showing the distribution of auto correlation peaks in the case where there is no digital television broadcast.

FIG. 5 is a view showing the distribution of auto correlation peaks in the case of a digital television broadcast, while FIG. 6 is a view showing the distribution of auto correlation peaks in the case of no digital television broadcast.

First, referring to FIG. 6, when there is no digital television broadcast, for example, when a received channel contains only noise, the auto correlation peaks P appear completely at random and the envelope becomes as shown by the curve P2 and has no periodicity. A one size larger auto correlation peak is shown at the center of the figure, but this is for example derives from the synchronization signal of an analog television broadcast.

On the other hand, see FIG. 5. If selecting a channel providing a digital television broadcast while selecting a channel, the envelope of the auto correlation peaks P exceeding a predetermined threshold value in the signal received from that channel is present at a single location of the curve P1. The width of that distribution tends strongly to fit in a predetermined width W. The width of the distribution is probably formed in this way due to the effects of waves reflected from buildings or mountains (in the case of car mounted use) or due to the effects of aircraft flying nearby (in the case of home use).

The state of the distribution of the cluster of auto correlation peaks P (periodic signals) is found in this way by the above-mentioned periodicity distribution finding function unit 22. The distribution has to be observed over a certain time. There are two modes of this. In the first mode, the periodicity distribution finding function unit 22 repeatedly detects the periodic signals (auto correlation peaks P) over a predetermined time (for example, 50 ms) to find the state of distribution of the cluster of periodic signals (P). Further, in the second mode, the periodicity distribution finding function unit 22 detects the repeatedly appearing periodic signals (auto correlation peaks P) a predetermined number of times (for example, 30 times) to find the state of distribution of the cluster of periodic signals (P).

Note that the periodicity distribution finding function unit 22 is realized by a software configuration using the CPU 33, but the invention is not limited to this and may also be configured by hardware. As one example, a ring buffer may be used. If one turn of the ring shaped memory is linked with one frame length, when there is a digital television broadcast, the logic "1" (or "0") appears concentrated at one location of the ring.

Therefore, when the periodicity distribution finding function unit 22 finds the distribution of the cluster of auto correlation peaks P, next that distribution information is given to the next decision function unit 23 where whether that distribution fits in the predetermined width W, that is, if there is a digital television broadcast or not, is decided.

Figure 7:
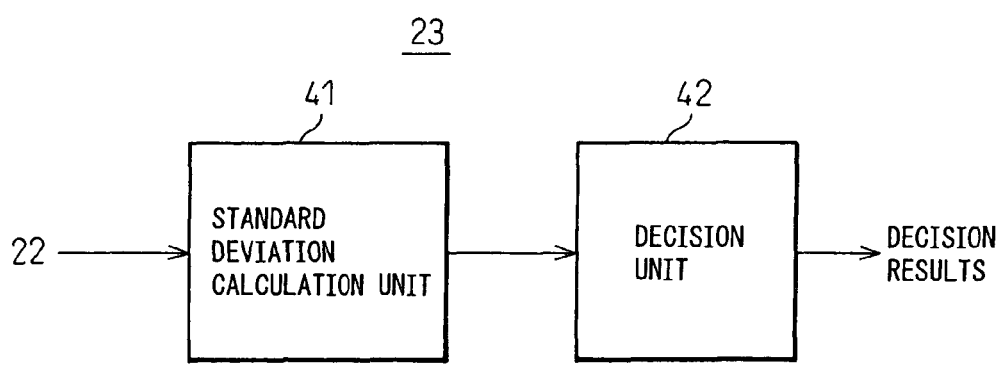
FIG. 7 is a view showing a first example of the configuration of a decision function unit 23.
Figure 8:
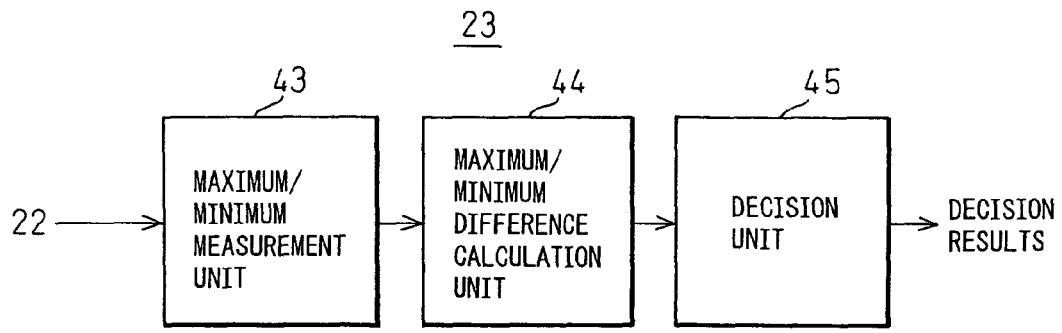
FIG. 8 is a view showing a second example of the configuration of a decision function unit 23.

FIG. 7 is a view showing a first example of the configuration of the decision function unit 23, while FIG. 8 is a view showing a second example of the configuration of the decision function unit 23. Both show hardware configurations, but in practice a software configuration using the CPU 33 is preferable.

According to the configuration of FIG. 7, the decision function unit 23 includes a standard deviation calculation unit 41 for calculating the standard deviation of the distribution of the cluster of auto correlation peaks (periodic signals). Whether this fits in the predetermined width W is decided from the calculated standard deviation value by a decision unit 42.

Further, according to the configuration of FIG. 8, the decision function unit 23 measures the maximum value and minimum value (right end and left end of W of FIG. 5) of the distribution of the cluster of auto correlation peaks (periodic signals) by the maximum/minimum measuring unit 43, finds the difference of the maximum value and minimum value by the maximum/minimum difference calculation unit 44, and decides if that size fits in the predetermined width W by the decision unit 45.

The basic configuration of the present invention was explained above. Below, nine examples of configurations able to further increase the added value will be explained (first example to ninth example).

(1) In a first example, there is a level detector 16 for detecting the level of the received signal after the channel selecting function unit 12 (FIG. 2). When the level of the received signal of the selected channel is a predetermined value or less (digital or analog), it decides that there is no broadcast and selects the next channel by the channel selecting function unit 12. According to this first example, channels clearly without broadcasts end up being eliminated in advance even before the detection operation of the broadcast channel detection system 20 in FIG. 2, so no useless detection operations are performed and a faster speed channel search can be expected.

(2) In a second example, the digital broadcasts are arranged in order from the digital broadcast of the channel with the largest level of the received signal detected by the level detector 16 to the digital broadcast of the channel with the smallest level and displays the list of receivable digital broadcasts to the user. The levels detected by the level detector 16 are recorded by the CPU 33 in the memory 24. The levels are sorted from the largest to the smallest one and held in that memory 24 as a table. By providing the user with the broadcasts with the larger levels, that is, the broadcasts with the best reception states, the user comfort and convenience can be improved.

(3) In a third example, after the decision function unit 23 decides that there is a digital broadcast, the likelihood of that decision is determined by the establishment of frame synchronization at the frame synchronization unit 17 forming the digital broadcast receiver 10 (FIG. 2). For example, the broadcast channel detection system 20 searches through the 50 channels and for example picks up 15 channels. By then determining whether the inherent frame synchronization has been completed for those 15 channels, an extremely precise channel search can be performed. However, it is also possible to determine if frame synchronization has been completed each time one of the 15 channels is found, that is, each time the broadcast channel detection system 20 decides there is a digital broadcast.

(4) In a fourth example, when the decision function unit 23 decides that there is a digital broadcast, the transport stream extracted from the received signal of that channel is decoded to obtain the name of that broadcast station. The channel number may also be obtained. Note that the name etc. of each broadcast station may be obtained for example after finishing all of the 50 channels' worth of the searches or each time one channel search is completed.

(5) In a fifth example, the decision function unit 23 lists the digital broadcasts in order from the digital broadcast with the smallest variation in distribution of the cluster in a predetermined width W (FIG. 5) to the digital broadcast with the largest variation and displays a list of the receivable digital broadcasts to the user. This can be performed in the same way as the above-mentioned second example and enables the user to be informed of broadcasts in the order from the one with the best reception state.

(6) In a sixth example, when the decision function unit 23 decides there are a plurality of channels carrying digital broadcasts, it arranges the channels in order of the quality of reception of the received signal and displays a list of receivable digital broadcasts to the user. This can be performed in the same way as the above-mentioned second example. It is also possible to arrange the good channels in order after all channel searches have been completed. Further, it is also possible to sort and arrange them in order after each channel search is completed. Note that as the "quality of reception" here, the continuously calculated bit error rate (BER) can be employed.

(7) In a seventh example, one branch selecting a channel decided by the decision function unit 23 to carry a digital broadcast provides the video/audio information of that digital broadcast to the user while the remaining branches continue the search of the broadcast channels. This example can be employed in the case of the (DIV) carrier diversity configuration as shown at the right end of FIG. 2. It is also possible to continue with the channel search while immediately providing the first captured digital broadcast to the user for his enjoyment.

(8) In an eighth example, there is a reception environment estimating function unit for estimating the reception environment of the digital broadcast receiver 10. This enables the predetermined width W (FIG. 5) in the synchronization distribution finding function unit 22 to be adjusted in accordance with the reception environment.

Figure 9:
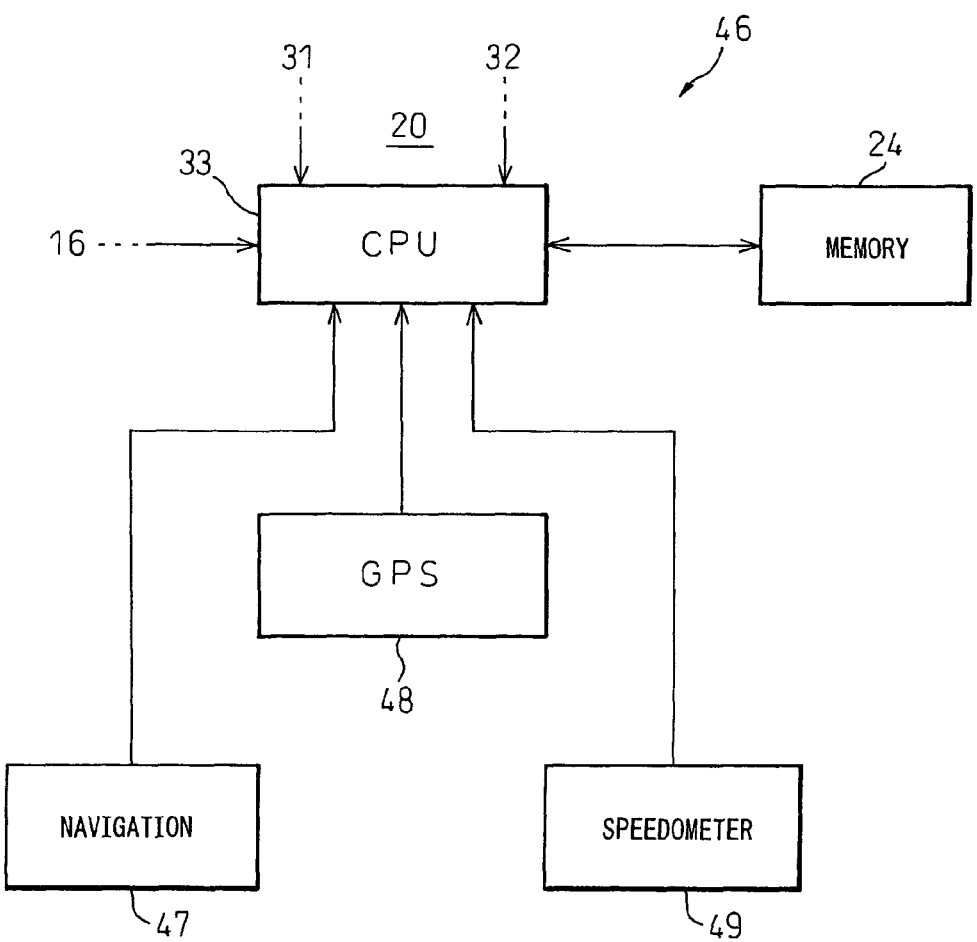
FIG. 9 is a view of an example of the configuration of a reception environment estimating function unit.

FIG. 9 is a view showing an example of the configuration of the reception environment estimating function unit. This reception environment estimating function unit 46 is configured so that the CPU 33 of FIG. 2 receives as input the navigation information from a navigation system 47, position information from a GPS system 48, and vehicle speed information from a speedometer 49.

Based on that input information, the CPU 33 can determine under what conditions that vehicle is driving and as a result can deduce what kind of reception environment it is in.

For example, if the vehicle is driving in the city or on a highway, the predetermined width W may be made larger to enable as many broadcast channels as possible to be captured. On the other hand, if the vehicle is stopped, the predetermined width W may be reduced to make searches of mistaken broadcast channels more difficult.

(9) In a ninth example, the decision function unit 23 lists up one or more channels decided to carry digital broadcasts, then the periodic signal detecting function unit 21 and the periodicity distribution finding function unit 22 and decision function unit 23 list up the results of the searches of the digital broadcasts for the listed up channels one more time. Due to this, it is possible to perform more accurate channel searches. Note that the list should be configured as a table in the memory 24 (FIG. 2).

Finally, a preferred example of a digital broadcast receiver 10 according to the present invention incorporating this broadcast channel detection system 20 will be explained. This is a digital broadcast receiver comprised of a digital broadcast receiver 10 provided with a broadcast channel detection system 20 explained in detail up to here, configured so that when shifting from a digital broadcast of a channel currently being received to another channel adjoining it in the frequency domain, a channel decided to carry a digital broadcast by the decision of the broadcast channel detection system 20 of the present invention is made that adjoining channel, while when the decision decides that there is no digital broadcast, a search for a channel further shifted in frequency is shifted to.

In such a digital broadcast receiver, when a user wants to enjoy the broadcast of an adjoining channel instead of the channel (digital broadcast) currently being enjoyed, he may press a predetermined seek button to automatically start the seek operation of the adjoining channel. Since the broadcast channel detection system 20 according to the present invention is mounted, this channel seek operation is completed in an extremely short time.

INDUSTRIAL APPLICABILITY

The present invention can be utilized when the digital broadcast receiver provided with the channel search function has a reception mechanism which can extract signal components having a constant periodicity.

EXPLANATION OF NOTATIONS 10 digital broadcast receiver
12 channel selecting function unit
13 OFDM demodulation unit
14 video/audio reproduction processor
15 RF/IF unit (frequency conversion unit)
16 level detector
17 frame synchronization unit
19 OFDM demodulator
DIV diversity circuit
20 broadcast channel detection system
21 periodic signal detecting function unit
22 periodicity distribution finding function unit
23 decision function unit
24 memory
31 auto correlator
32F frequency synchronization loop filter
32T time synchronization loop filter
33 CPU
35 correlation computing unit
36 delay unit
37 delay amount setting unit
41 standard deviation calculation unit
42 decision unit
43 maximum/minimum measuring unit
44 maximum/minimum difference calculation unit
45 decision unit
46 reception environment estimating function unit

The invention claimed is:

1. A digital broadcast receiver, comprising:
a periodic signal detecting unit, including an auto correlator therein, for receiving as input a received signal of a broadcast wave and detecting periodic signals appearing at a substantially constant timing, as auto correlation peaks output from the auto correlator;
a periodicity distribution finding unit for finding a distribution of a cluster of periodic signals based on statistical values, the statistical values obtained by observing a plurality of times for said auto correlation peaks exceeding a certain predetermined threshold value, over time, and taking statistics of the observation results; and
a decision unit for deciding that there is a digital broadcast when a width of a distribution of said cluster is found based on said statistical values by said periodicity distribution finding unit fits in a predetermined width or deciding that there is no digital broadcast when the width of the distribution of said cluster does not fit in said predetermined width.

2. A digital broadcast receiver as set forth in claim 1, wherein when said digital broadcast receiver is provided with a frequency synchronization loop filter and a time synchronization loop filter provided after said auto correlator, the periodic signal detecting unit is configured to detect, as the periodic signals, the filter output which is output from either of the frequency synchronization loop filter, or time synchronization loop filter linked with the auto correlation peaks and exceeding a predetermined threshold value.

3. A digital broadcast receiver as set forth in claim 1, wherein said decision unit includes a standard deviation calculation unit for calculating a standard deviation of the distribution of the cluster of periodic signals and for deciding whether the calculated standard deviation fits in the predetermined width.

4. A digital broadcast receiver as set forth in claim 1, wherein said decision unit is configured to measure a maximum value and a minimum value of the distribution of the cluster of periodic signals and to decide whether a difference of the measured maximum value and minimum value fits in the predetermined width.

5. A digital broadcast receiver as set forth in claim 1, wherein said digital broadcast receiver is of a carrier diversity configuration having a plurality of branches, each branch is provided with said periodic signal detecting unit, said periodicity distribution finding unit, and said decision unit.

6. A digital broadcast receiver as set forth in claim 1, further comprising a level detector for detecting a level of the received signal after the channel selecting unit determines that there is no broadcast, wherein the channel selecting unit is configured to select a next channel when the level of the received signal of the selected channel is equal to or less than a predetermined value.

7. A digital broadcast receiver as set forth in claim 1, further comprising a frame synchronization unit for establishing a frame synchronization, after the decision unit determines that there is a digital broadcast, for determining a likelihood of said decision.

8. A digital broadcast receiver as set forth in claim 1, wherein when the decision unit decides that there is a digital broadcast, a transport stream extracted from the received signal of a given channel is decoded to obtain a name of a broadcast station.

9. A digital broadcast receiver as set forth in claim 1, wherein the decision unit lists the digital broadcasts from a digital broadcast with the smallest variation in distribution of the cluster in a predetermined width to a digital broadcast with the largest variation, and displays a list of the receivable digital broadcasts.

10. A digital broadcast receiver as set forth in claim 6, wherein the decision unit lists the digital broadcasts from a digital broadcast with the largest level of said received signal detected by the level detector to a digital broadcast with the smallest variation of said level of said received signal, and displays a list of the receivable digital broadcasts.

11. A digital broadcast receiver as set forth in claim 9, wherein when the decision unit decides there are a plurality of channels carrying digital broadcasts, the decision unit arranges the channels in order of a quality of reception of the received signal, and displays a list of receivable digital broadcasts.

12. A digital broadcast receiver as set forth in claim 5, wherein one branch selecting a channel decided by the decision unit to carry a digital broadcast provides video/audio information of said digital broadcast to a user while the remaining branches continue searching for the broadcast channels.

13. A digital broadcast receiver as set forth in claim 1, further comprising a reception environment estimating unit for estimating a reception environment of the digital broadcast receiver, wherein the receiver enables the predetermined width in the synchronization distribution finding unit to be adjusted, in accordance with the estimated reception environment.

14. A digital broadcast receiver as set forth in claim 1, wherein the decision unit enrolls one or more of said channels to carry a digital broadcast and said periodic signal detecting unit, said periodicity distribution finding unit, and said decision unit retry searching for said digital broadcast in accordance with the listed up channels.

15. A digital broadcast receiver as set forth in claim 1, wherein the decision unit is configured to shift to an adjoining channel in a frequency domain when there is digital broadcast in said adjoining channel, and when the decision unit determines that there is no digital broadcast in said adjoining channel, the decision unit is configured to shift to a search for a channel further shifted in frequency than said adjoining channel.

16. A method for detecting a broadcast channel in a digital broadcast receiver, comprising:

receiving as input a received signal of a broadcast wave and detecting periodic signals appearing at substantially constant timing, as auto correlation peaks output from an auto correlator, finding a distribution of a cluster of said periodic signals based on statistical values, by observing a plurality of times said auto correlation peaks exceeding a certain predetermined threshold value, over time, and taking statistics of the observation results to obtain said statistical values; and deciding that there is a digital broadcast when a width of a distribution of said cluster found based on statistic value by said second step fits in a predetermined width or deciding that there is no digital broadcast when it does not fit in said predetermined width.

* * * * *